United States Patent [19]

Houlihan et al.

[11] 3,878,215

[45] Apr. 15, 1975

[54] 2-ALKYL-3-SUBSTITUTED-4-ARYL ISOQUINOLINES

[75] Inventors: William J. Houlihan, Mountain Lakes; Jeffrey Nadelson, Lake Parsippany, both of N.J.

[73] Assignee: Sandoz-Wander, Inc., Hanover, N.J.

[22] Filed: Sept. 21, 1973

[21] Appl. No.: 399,431

Related U.S. Application Data

[63] Continuation-in-part of Ser. No. 205,324, Dec., 1971, abandoned.

[52] U.S. Cl.......... 260/283 R; 260/283; 260/286 R; 260/289 R; 260/343.3; 260/515 R; 260/515 A; 260/558 R; 260/559 A; 260/559 R; 424/258
[51] Int. Cl.............................................. C07d 33/14
[58] Field of Search ................................ 260/283 R

[56] References Cited

UNITED STATES PATENTS

| | | | |
|---|---|---|---|
| 3,666,763 | 5/1972 | Grethe | 260/289 R |
| 3,753,994 | 8/1973 | Diane | 260/288 R |
| 3,775,416 | 11/1973 | Reemlinger et al. | 260/288 R |

*Primary Examiner*—Richard J. Gallagher
*Assistant Examiner*—Mary C. Vaughn
*Attorney, Agent, or Firm*—Gerald D. Sharkin; Robert S. Honor

[57] ABSTRACT

2-Alkyl-3-substituted-4-aryl isoquinolines, e.g. 3-tertiary butyl-2-methyl-4-phenyl-1,2-dihydroisoquinoline, prepared from corresponding isocarbostyril compounds, are useful as anti-inflammatory agents.

2 Claims, No Drawings

2-ALKYL-3-SUBSTITUTED-4-ARYL ISOQUINOLINES

This application is a continuation-in-part of application Ser. No. 205,324, filed Dec. 6, 1971 now abandoned.

This invention pertains to 2-alkyl-3-substituted-4-aryl isoquinolines. More particularly, it concerns 2-alkyl-3-substituted-4-phenyl or substitutedphenyl-1,2-dihydroisoquinolines, intermediates and acid addition salts thereof, and processes for their preparation.

The isoquinolines of this invention may be represented by the following structural formula:

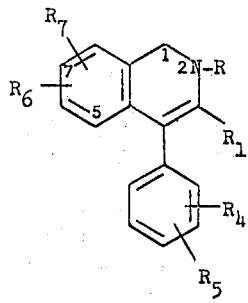

where
  R represents lower alkyl, i.e. alkyl of 1–4 carbon atoms, e.g. methyl, ethyl, propyl, isopropyl, butyl, and the like,
  $R_1$ represents

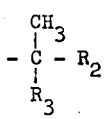

where
  $R_2$ and $R_3$ are each independently methyl or ethyl, or $R_2$ and $R_3$ together represent $(CH_2)_n$ where
  $n$ represents 4, 5, and 6, and
  $R_4$, $R_5$, $R_6$, and $R_7$ each independently represent hydrogen, halo of atomic weight 19–36, trifluoromethyl, lower alkyl, as defined above, and lower alkoxy, i.e. alkoxy having 1–4 carbon atoms, such as methoxy, ethoxy, isopropoxy, and the like,
provided that $R_6$ and $R_7$ may not represent alkyl at the 8-position, and provided further that two trifluoromethyl or two tertiary butyl groups or a trifluoromethyl and a tertiary butyl group are not on adjacent carbon atoms.

Compounds of formula (I) are prepared from corresponding isocarbostyril compounds of formula (II) according to the following reaction scheme:

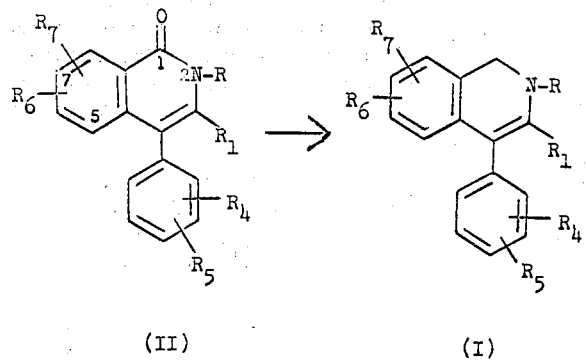

where R through $R_7$ and the provisos are as set out above.

Compounds (II) may be converted into compounds (I) with a mild reducing agent such as metal hydride, particularly lithium aluminum hydride, in inert ether solvent, such as ethyl ether or tetrahydrofuran, at a temperature of from about 30°–100°C., conveniently at the reflux temperature of the solvent. The time of reaction may be about 15–48 hours. Neither time, temperature of reaction, nor the solvent used is critical. The product may be recovered using conventional techniques and, if desired, the free base of compounds (I) may be converted into acid addition salts for simplified recovery.

The compounds of formula (II) represent an additional aspect of this invention and they may be prepared according to the following reaction scheme:

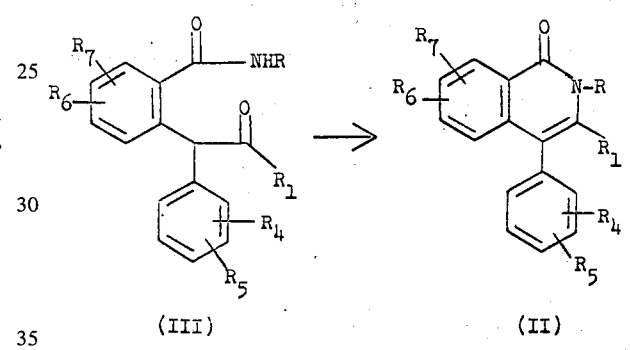

where
  R through $R_7$ and the provisos regarding compounds (II) are as set out above,
provided also that $R_6$ and $R_7$ may not represent alkyl at a position ortho to the carbon bonded to the amido group on compounds (III), provided further, that two trifluoromethyl or two tertiary butyl groups or a trifluoromethyl and a tertiary butyl group are not on adjacent carbon atoms.

Compounds (II) may be prepared from compounds (III) by treating the latter, optionally in inert hydrocarbon solvent, e.g. benzene, toluene, xylene and the like, in the presence of catalytic amounts of strong acid, such as strong mineral acid, e.g. hydrochloric, hydrobromic or sulfuric acid, at a temperature of about 50°–180°C., conveniently at the reflux temperature of the system, for about 1–24 hours. Normally, the reaction may be permitted to continue until water is no longer emitted from the reaction mixture. Neither the time, temperature nor solvent utiilized is critical in obtaining compounds (II).

Compounds of formula (III) represent a further aspect of this invention and may be obtained according to the following reaction scheme from compounds (V) and novel compounds (IV).

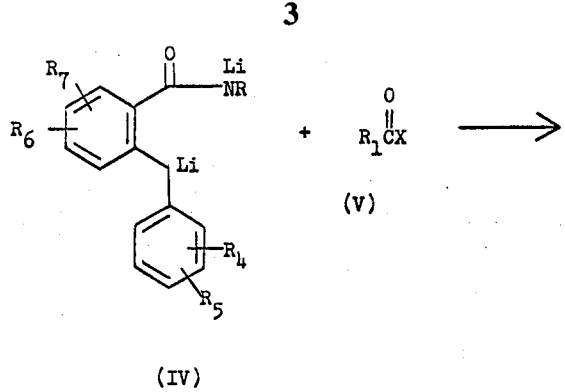

(IV)    (III)

where
R, R₁, R₄, R₅, R₆ and R₇ and the provisos are as set out above regarding compounds (III), and
X represents halo of atomic weight 35–80.

Compounds (IV) and (V) are reacted in inert solvent such as hydrocarbon solvents, such as benzene or toluene, or ethers such as ethyl ether or tetrahydrofuran, at a temperature of from about −60° to about 10°C. The preferred temperature range is about −20° to −50°C. The reaction may be run for 1–10 hours, and the particular time, temperature and solvent used are not considered critical in this process.

The compounds of formula (IV) may be obtained from the compounds of formula (VI)

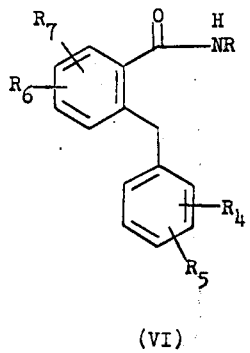

(VI)

where
R, R₄, R₅, R₆, R₇ and the provisos are as set out above for compounds (III),
by treatment with a lithiating agent, particularly an alkyl or aryl lithium compound; n-butyl lithium is especially preferred. This reaction may be performed in solvent and for a period of time similar to that described above in connection with the process for obtaining compounds (III). The temperature of the reaction is preferably from about −10° to +10°C. Compound (IV) is normally not isolated from the reaction mixture and may be used directly in the process for preparing compounds (III) above.

The compounds (VI) are preparable from compounds of the formula

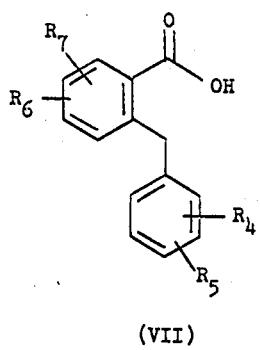

(VII)

where
R₄ through R₇ are as set out above,
provided that R₆ and R₇ may not represent alkyl at a position ortho to the carbon bonded to the acid group, and provided further that two trifluoromethyl or two tertiary butyl groups or a trifluoromethyl and a tertiary butyl group are not on adjacent carbon atoms, in a standard manner by halogenating compounds (VII) with halogenating agents such as thionyl chloride, and aminating the resulting acid halide with the appropriate alkylamine.

The compound (VII) is prepared according to the following reaction scheme:

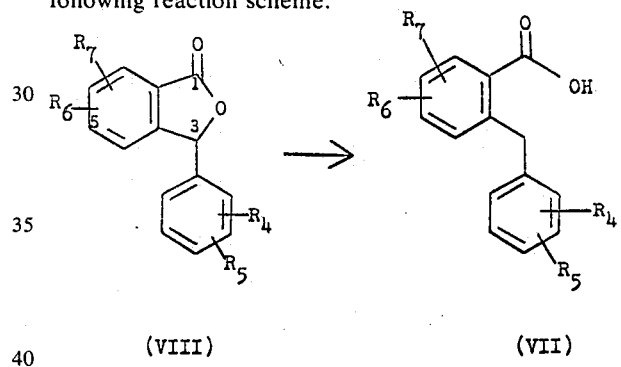

(VIII)    (VII)

where
R₄ through R₇ are as set out above, provided that R₆ and R₇ may not represent alkyl at the 7-position on compounds (VIII), and provided further that two trifluoromethyl or two tertiary butyl groups or a trifluoromethyl and a tertiary butyl group are not on adjacent carbon atoms.

Compounds (VII) are prepared from compounds (VIII) by hydrogenating the former with hydrogen gas in the presence of a platinum metal catalyst, preferably palladium on carbon. The hydrogenation is conveniently performed in alcoholic solvents at room temperature, but the particular solvent and temperatures utilized may vary and are not critical to the reaction.

Compounds (VIII) represent a still further aspect of this invention and may be prepared according to the following reaction scheme:

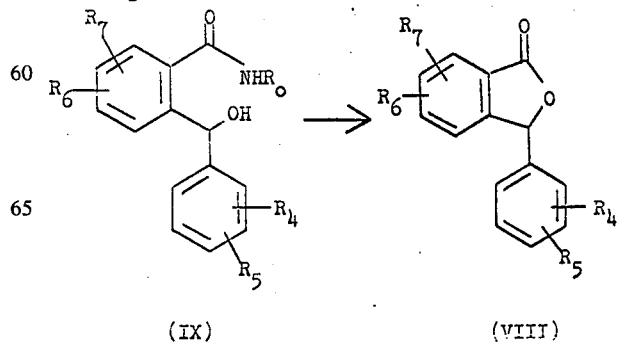

(IX)    (VIII)

where $R_4$ through $R_7$ are as set out above, as are the provisos respecting compounds (VIII), and $R_o$ represents lower alkyl, as defined above, or phenyl, provided that regarding compounds (IX) $R_6$ and $R_7$ do not represent alkyl at a position ortho to the carbon bonded to the amido group, and provided further that two trifluoromethyl or two tertiary butyl groups or a trifluoromethyl and a tertiary butyl group are not on adjacent carbon atoms.

According to the above process, compound (IX) is heated in inert hydrocarbon or halogenated hydrocarbon solvent, e.g. benzene, toluene, pentane, o-dichlorobenzene and the like. The reaction may be carried out at a temperature of about 80°–200°C., and conveniently at the reflux temperature of the solvent utilized. The temperature and solvent are not critical in obtaining compounds (VIII).

The compounds of formula (IX) are novel and are obtainable from compounds (X) according to the following reaction scheme:

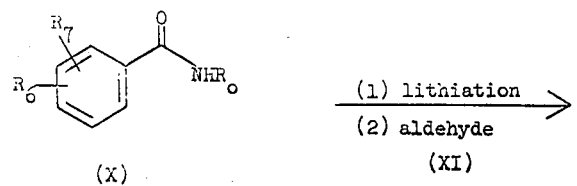

(X)   (1) lithiation
      (2) aldehyde
      (XI)

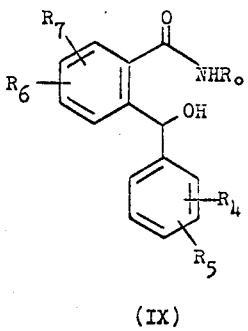

(IX)

where $R_4$ through $R_7$, $R_o$ and the provisos are as set out above for compounds (IX).

Compounds (IX) are prepared from compounds (X) in inert hydrocarbon or ether solvent, e.g. benzene, toluene, ethyl ether, tetrahydrofuran and the like. The reaction is a two step reaction involving lithiation of the compound (X) to obtain a dilithio intermediate thereof, which in turn is treated with an appropriately substituted benzaldehyde (XI) to obtain compounds (IX). The lithiation is preferably performed at a temperature between about −60° to +10°C. for about 1–3 hours whereas the second step, generally performed without separation of the dilithio intermediate, is performed between −10° and +10°C. for about 1–3 hours.

Unless specifically indicated otherwise, the products of each of the reactions described above may be recovered by conventional techniques such as crystallization, filtration, trituration, and the like.

Certain of the compounds of formula (V), (X) and (XI) are known and may be prepared according to methods disclosed according to the literature. The compounds of formula (V), (X) and (XI) not specifically disclosed may be prepared by methods analogous to those in the literature from known compounds.

The compounds of formula (I) above are useful because they possess pharmacological properties in animals, such as mammals. In particular, the compounds may be used as anti-inflammatory agents as indicated by their activity in rats orally administered active agent at a dose of 50–100 mg/kg of animal body weight. Edema is induced by carrogeenan and the rats are treated according to the method of Winter (Proc. Soc. Exp. Biol., 111:544, 1962).

For such usage, the compounds of formula (I) may be combined with a pharmaceutically acceptable carrier or adjuvant, and may be administered orally in such forms as tablets, capsules, elixers, suspensions and the like, or parenterally in the form of an injectable solution or suspension. The dosage will vary depending upon the mode of administration utilized and the particular compounds employed.

As indicated above, the compounds of formula (I) may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral salts, such as hydrochloride, hydrobromide, sulfate, phosphate and the like and the organic acid salts, such as the succinate, benzoate, acetate, p-toluensulfonate, benzenesulfonate and the like.

In general, satisfactory results are obtained when the compounds (I) are administered orally at a daily dosage of from about 2–200 mg/kg of animal body weight, preferably given in divided doses, 2 to 4 times a day or in sustained release form. For most larger mammals (e.g., primates) the total daily dosage is from about 150–2,000 mg per day. Dosage forms suitable for internal use comprises from about 35 mg to about 1000 mg of the active compound in intimate admixture with a solid or liquid pharmaceutically acceptable carrier or diluent.

Tablets and capsules containing the ingredients indicated below may be prepared by conventional techniques and are useful in treating inflammation at a dose of one tablet or capsule 2 to 4 times a day.

| Ingredients | Weight (mg.) | |
| --- | --- | --- |
| | Tablet | capsule |
| 3-tertiary butyl-2-methyl-4-phenyl-1,2-dihydroisoquinoline | 50 | 50 |
| tragacanth | 10 | — |
| lactose | 197.5 | 250 |
| corn starch | 25 | — |
| talcum | 15 | — |
| magnesium stearate | 2 | — |
| Total | 300.0 mg. | 300.0 mg. |

The following pharmaceutical compositions are formulated with the indicated amount of active agent using conventional techniques. The injectable solution and the oral liquid solution represent formulations useful in the treatment of inflammation:

|  | Injectable Weight % | Liquid Weight % |
| --- | --- | --- |
| 3-tertiary butyl-2-methyl-4-phenyl-1,2 dihydroisoquinoline | 10 | 0.5 to 3.5 |
| sodium alginate | 0.5 | — |
| sodium benzoate | — | 0.1 to 0.5 |
| simple syrup | — | 30 to 70 |
| lecithin | 0.5 | — |
| sodium chloride | as desired | — |
| flavor | — | as desired |
| color | — | as desired |
| sorbitol solution 70% USP | — | 10 to 30 |
| buffer agent to adjust pH for desired stability | as desired | as desired |
| water | to desired volume | to desired volume |

EXAMPLE 1

N-methyl-α-(p-tolyl)-o-toluamide

To a flask equipped with a stirrer, dropping funnel, condenser and gas inlet tube maintained under a nitrogen atmosphere there is added at room temperature 67.5 g (0.5 mole) N-methyl benzamide and 1,200 ml. dry tetrahydrofuran. The reaction flask is immersed in an ice bath and cooled to an internal temperature of 5°C. Stirring is initiated and 688 ml. of 1.6 M. n-butyl lithium (1.1 mole) in hexane is added dropwise in ca at about 1 hour maintaining temperature below 8°C. The resulting dilithio salt is stirred at 5°C. for an additional hour and then a solution of 66 g. (0.55 mole) p-tolualdehyde in 500 ml. tetrahydrofuran is added dropwise in about 1 hour maintaining the temperature between −10° to 10°C. The resulting mixture is stirred at 5°C for 1 hour longer and 300 ml. of saturated ammonium chloride is added maintaining the temperature at about 10°C. The layers are separated and the organic phase dried over anhydrous magnesium sulfate, filtered and evaporated in vacuo. The residue is crystallized from either to give α-hydroxy-N-methyl-α-(p-tolyl)-o-toluamide; m.p. 162°–163°C.

A mixture of 80 g. of α-hydroxy N-methyl-α-(p-tolyl)-o-toluamide and (0.314 mole) 150 ml. o-dichlorobenzene is heated at reflux for 18 hours. The mixture is cooled and filtered and the resulting solid triturated with cold ether to give 3-p-tolyl phthalide, m.p. 133°–134°C.

When the above process is carried out and in place of p-tolualdehyde there is used a. p-chlorobenzaldehyde
b. o-tolualdehyde
c. p-methoxybenzaldehyde
d. m-trifluoromethylbenzaldehyde
e. 2,4-dichlorobenzaldehyde, or
f. benzaldehyde there is obtained through the corresponding intermediate α-hydroxy-N-methyl-o-toluamide, a. 3-p-chlorophenyl phthalide
b. 3-o-tolyl phthalide
c. 3-p-methoxyphenyl phthalide
d. 3-m-trifluoromethylphenyl phthalide
e. 3-(2,4-dichlorophenyl) phthalide, or
f. 3-phenyl phthalide, respectively.

When the above detailed procedure is carried out and in place of N-methyl benzamide there is used g. o-chloro-N-phenyl benzamide
h. N-methyl-p-toluamide
i. N-methyl-m-trifluoromethyl benzamide, or
j. o-ethoxy-N-methyl benzamide there is obtained through the corresponding intermediate α-hydroxy-α-(p-tolyl)-o-toluamide, g. 7-chloro-3-p-tolyl phthalide
h. 5-methyl-3-p-tolyl phthalide
i. 6-trifluoromethyl-3-p-tolyl phthalide, or
j. 7-ethoxy-3-p-tolyl-phthalide, respectively.

A mixture of 59 g. 3-p-tolyl phthalide (0.263 mold), 600 ml. ethanol and 5.9 g. of 10% Pd/C is hydrogenated at room temperature and 50 psi until 1 equivalent of $H_2$ is absorbed. The catalyst is removed by filtration and the solvent removed in vacuo and the residue triturated in petroleum ether to give α-(p-tolyl) o-toluic acid; m.p. 136.5°–138.5°C.

To a mixture of 53.2 g. (0.235 mole) α-(p-tolyl)o-toluic acid, 300 ml. ether and 10 ml. pyridine, add dropwise with stirring 25 ml. (0.35 mole) of thionyl chloride. The resulting mixture is stirred 21 hours at room temperature then filtered and the solvent removed in vacuo. The resulting acid chloride is dissolved in 150 ml. ether and added dropwise to 300 ml. of 40% methylamine in water, and cooled to 0°C. After addition is complete to resulting mixture is stirred 1 hour at room temperature, filtered and the solid washed with 100 ml. water, 100 ml. 2N sodium hydroxide and then with water until washings are neutral and then dried to give N-methyl-α-(p-tolyl)o-toluamide; m.p. 136°–137°C.

When the procedure described in the above two paragraphs is carried out and in place of 3-p-tolyl phthalide there is used a. 3-p-chlorophenyl phthalide
b. 3-o-tolyl phthalide
c. 3-p-methoxyphenyl phthalide
d. 3-m-trifluoromethylphenyl phthalide
e. 3-(2,4)-dichlorophenyl) phthalide
f. 3-phenyl phthalide
g. 7-chloro-3-p-tolyl phthalide
h. 5-methyl-3-p-tolyl phthalide
i. 6-trifluoromethyl-3-p-tolyl phthalide, or
j. 7-ethoxy-3-p-toly-phthalide, there is obtained through the corresponding acid and acid halide,
a. α-(p-chlorophenyl)-N-methyl-o-toluamide
b. N-methyl-α-(o-tolyl)-o-toluamide
c. α-(p-methoxyphenyl)-N-methyl-o-toluamide
d. N-methyl-α-(m-trifluoromethylphenyl)-o-toluamide
e. α-(2,4-dichlorophenyl)-N-methyl-o-toluamide
f. N-methyl-α-phenyl-o-toluamide
g. 6-chloro-N-methyl-α-(p-tolyl)-o-toluamide
h. 4,N-dimethyl-α-(p-tolyl)-o-toluamide
i. N-methyl-α-(p-tolyl)-5-trifluoromethyl-o-toluamide, or
j. 6-ethoxy-N-methyl-α-(p-tolyl)-o-toluamide, respectively.

EXAMPLE 2

N-methyl-α-phenyl-α-pivaloyl-o-toluamide

To a flask equipped with a stirrer, dropping funnel, condenser and gas inlet tube and maintained under a nitrogen atmosphere there is added at room temperature 50 g. (0.221 mole) of N-methyl-α-phenyl-o-toluamide in 1000 ml. dry tetrahydrofuran. The flask is immersed in an ice bath and cooled to an internal temperature of 5°C. Stirring is initiated and 336.5 ml. (0.490 mole) of n-butyl lithium (15% in hexane) is added dropwise in about 1 hour maintaining the temperature below 8°C. The resulting solution is stirred 2 hours at room temperature, cooled to 5°C., and 26.6 g. (0.221 mole) of pivaloyl chloride in 250 ml. of dry tetrahydrofuran is added dropwise maintaining temperature below 8°C. After addition, the mixture is stirred 2 hours at room temperature and hydrolyzed with 150 ml. of saturated ammonium chloride, the resulting solution is filtered and the layers separated. The organic layer is dried over magnesium sulfate, filtered and evaporated in vacuo. The residue is triturated with ether to give N-methyl-α-phenyl-α-pivaloyl-o-toluamide; m.p. 188°–188.5°C.

When the above process is carried out and in place of N-methyl α-phenyl-o-toluamide there is used
a. α-(p-chlorophenyl)-N-methyl-o-toluamide
b. N-methyl-α-(o-tolyl)-o-toluamide
c. α-(p-methoxyphenyl)-N-methyl-o-toluamide
d. N-methyl-α-(m-trifluoromethylphenyl)-o-toluamide
e. α-(2,4-dichlorophenyl)-N-methyl-o-toluamide
g. 6-chloro-N-methyl-α-(p-tolyl)-o-toluamide
h. 4,N-dimethyl-α-(p-tolyl)-o-toluamide
i. N-Methyl-α-(p-tolyl)-5-trifluoromethyl-o-toluamide, or
j. 6-ethoxy-N-methyl-α-(p-tolyl)-o-toluamide,
there is obtained
a. α-(p-chlorophenyl)-N-methyl-α-pivaloyl-o-toluamide
b. N-methyl-α-pivaloyl-α-(tolyl)-o-toluamide
c. α-(p-methoxyphenyl)-α-pivaloyl-N-methyl-o-toluamide
d. N-methyl-α-pivaloyl-α-(m-trifluoromethylphenyl)-o-toluamide
e. α-(2,4-dichlorophenyl)-N-methyl-α-pivaloyl-o-toluamide
g. 6-chloro-N-methyl-α-pivaloyl-α-(p-tolyl)-o-toluamide
h. 4,N-dimethyl-α-pivaloyl-α-(p-tolyl)-o-toluamide
i. N-methyl-α-pivaloyl-α-(p-tolyl)-5-trifluoromethyl-o-toluamide, or
j. 6-ethoxy-N-methyl-α-pivaloyl-α-(p-tolyl)-o-toluamide, When the above process is carried out and in place of pivaloyl chloride there is used 2,2-dimethylbutanoyl chloride or 1-methyl cyclohexanecarbonylbromide, there is obtained
k. α-(2,2-dimethylbutanoyl)-N-methyl-α-phenyl-o-toluamide, or
l. N-methyl-α-(1-methyl cyclohexanoyl)-α-phenyl-o-toluamide, respectively.

EXAMPLE 3

3-tert.butyl-2-methyl-4-phenyl-isocarbostyril

A mixture of 21.9 g. (0.71 mole) of N-Methyl-α-phenyl-α-pivaloyl-o-toluamide, 1 g. (0.005 mole) of p-toluenesulfonic acid hydrate and 350 ml. of benzene is refluxed with a water separator. After water stops separating, the mixture is cooled, washed with 100 ml. of 2N sodium hydroxide, dried over magnesium sulfate, filtered and evaporated in vacuo. The residue is triturated with cold benzene to give 3-tert.butyl-2-methyl-4-phenyl isocarbostyril; m.p. 211°–213°C.

When the above process is carried out and in place of N-methyl-α-phenyl-α-pivaloyl-o-toluamide there is used
a. α-(p-chlorophenyl)-N-methyl-α-pivaloyl-o-toluamide
b. N-methyl-α-pivaloyl-α-(o-tolyl)-o-toluamide
c. α-(p-methoxyphenyl)-N-methyl-α-pivaloyl-o-toluamide
d. N-methyl-α-pivaloyl-α-(m-trifluoromethylphenyl)-o-toluamide
e. α-(2,4-dichlorophenyl)-N-methyl-α-pivaloyl-o-toluamide
g. 6-chloro-N-methyl-α-pivaloyl-α(p-tolyl)-o-toluamide
h. 4,N-dimethyl-α-pivaloyl-α-(p-tolyl)-o-toluamide
i. N-methyl-α-pivaloyl-α-(p-tolyl)-5-trifluoromethyl-o-toluamide
j. 6-ethoxy-N-methyl-α-pivaloyl-α-(p-tolyl)-o-toluamide
k. α-(2,2-dimethylbutanoyl)-N-methyl-α-phenyl-o-toluamide, or
l. N-methyl-α-(1-methyl cyclohexanoyl)-α-phenyl-o-toluamide,
there is obtained
a. 3-tert.butyl-4-(p-chlorophenyl)-2-methyl isocarbostril
b. 3-tert.butyl-2-methyl-4-(o-tolyl) isocarbostyril
c. 3-tert.butyl-4(p-methoxyphenyl)-2-methyl isocarbostril
d. 3-tert.butyl-2-methyl-4-(m-trifluoromethylphenyl isocarbostyril
e. 3-tert.butyl-4-(2,4-dichlorophenyl)-2-methyl isocarbostyril
g. 3-tert.butyl-8-chloro-2-methyl-4-(p-tolyl) isocarbostyril
h. 3-tert.butyl-2,6-dimethyl-4-(p-tolyl) isocarbostyril
i. 3-tert.butyl-2-methyl-4-(p-tolyl)-7-trifluoromethyl isocarbostyril
j. 3-tert.butyl-8-ethoxy-2-methyl-4(p-tolyl) isocarbostyril
k. 3-(2,2-dimethylbutyl)-2-methyl-4-phenyl isocarbostyril, or
l. 3-1(1-methyl cyclohexyl)-2-methyl-4-phenyl isocarbostyril, respectively.

EXAMPLE 4

3-tert.butyl-2-methyl-4-phenyl-1,2-dihydroisoquinoline hydrochloride

To a suspension of 3.1 g. (0.082 mole) of lithium aluminum hydride and 300 ml. of dry tetrahydrofuran under nitrogen gas is portionwise added a suspension of 12 g. (0.041 mole) of 3-tert.butyl-2-methyl-4-phenyl isocarbostyril and 100 ml. of tetrahydrofuran. The mixture is refluxed 30 hours, cooled in an ice bath and hydrolyzed with 100 ml. of saturated sodium sulfate solution. The mixture is filtered and the solvent evaporated in vacuo. The residue is dissolved in ether and treated with gaseous HCl. The resulting solid is filtered and recrystallized from isopropanol to give 3-tert.butyl-2-methyl-4-phenyl-1,2-dihydroisoquinoline hydrochloride; m.p. 194°–195°C.

When the above process is carried out and in place of 3-tert.butyl-2-methyl-4-phenyl isocarbostyril there is used.

a. 3-tert-butyl-4-(p-chlorophenyl)-2-methyl isocarbostril
b. 3-tert.butyl-2-methyl-4-(o-tolyl) isocarbostyril
c. 3-tert.butyl-4(p-methoxyphenyl)-2-methyl isocarbostyril
d. 3-tert.butyl-2-methyl-4-(m-trifluoromethylphenyl) isocarbostyril
e. 3-tert.butyl-4-(2,4-dichlorophenyl)-2-methyl isocarbostyril
g. 3-tert.butyl-8-chloro-2-methyl-4-(p-tolyl) isocarbostyril
h. 3-tert.butyl-2,6-dimethyl-4-(p-tolyl) isocarbostyril
i. 3-tert.butyl-2-methyl-4-(p-tolyl)-7-trifluoromethyl isocarbostyril
j. 3-tert.butyl-8-ethoxy-2-methyl-4-(p-tolyl) isocarbostyril
k. 3-(2,2-dimethylbutyl)-2-methyl-4-phenyl isocarbostyril, or
l. 3-(1-methyl cyclohexyl)-2-methyl-4-phenyl isocarbostyril, there is obtained as the hydrochloride, a. 3-tert.butyl-4-(p-chlorophenyl)-2-methyl-1,2 dihydroisoquinoline
b. 3-tert.butyl-2-methyl-4-(o-tolyl)-1,2-dihydroisoquinoline
c. 3-tert.butyl-4(p-methoxyphenyl)-2-methyl-1,2-dihydroisoquinoline
d. 3-tert.butyl-2-methyl-4-(trifluoromethylphenyl)1,2-dihydroisoquinoline
e. 3-tert.butyl-4(2,4-dichlorophenyl)-2-methyl-1,2-dihydroisoquinoline
g. 3-tert.butyl-8-chloro-2-methyl-4(p-tolyl)1,2-dihydroisoquinoline
h. 3-tert.butyl-2,6-dimethyl-4-(p-tolyl)-1,2-dihydroisoquinoline
i. 3-tert.butyl-2-methyl-4-(p-tolyl)-7-trifluoromethyl-1,2-dihydroisoquinoline
j. 3-tert.butyl-8-ethoxy-2-methyl-4-(p-tolyl)-1,2-dihydroisoquinoline
k. 3-(2,2-dimethylbutyl)-2-methyl-4-phenyl-1,2-dihydroisoquinoline, or
l. 3-(1-methylcyclohexyl)-2-methyl-4-phenyl-1,2-dihydroisoquinoline, respectively.

What is claimed is:

1. A compound of the formula

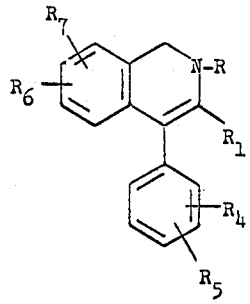

where
R represents lower alkyl,
$R_1$ represents

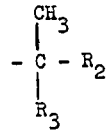

where
$R_2$ and $R_3$ are each, independently, methyl or ethyl, or $R_2$ and $R_3$ together represent $(CH_2)_n$ where $n$ represents 4, 5, or 6, and
$R_4$, $R_5$, $R_6$, and $R_7$ each, independently, represent hydrogen, halo of atomic weight 19–36, trifluoromethyl, lower alkyl, or lower alkoxy, provided that $R_6$ and $R_7$ may not represent alkyl at the 8-position, and provided further that two trifluoromethyl or two tertiary butyl groups or a trifluoromethyl and a tertiary butyl group are not on adjacent carbon atoms, or a pharmaceutically acceptable acid addition salt thereof.

2. A compound of claim 1 which is 3-tert.butyl-2-methyl-4-phenyl-1,2-dihydroisoquinoline.

* * * * *